United States Patent

[11] 3,588,664

| [72] | Inventor | Masahiko Akamatsu<br>Amagasaki, Japan |
|---|---|---|
| [21] | Appl. No. | 812,250 |
| [22] | Filed | Apr. 1, 1969 |
| [45] | Patented | June 28, 1971 |
| [73] | Assignee | Mitsubishi Denki Kabushiki Kaisha<br>Tokyo, Japan |

[54] MULTIPHASE DC CHOPPER CIRCUIT
6 Claims, 8 Drawing Figs.

[52] U.S. Cl. ............................................. 321/2,
318/512, 321/43
[51] Int. Cl. ....................................... H02m 3/32
[50] Field of Search............................. 323/1, 4, 22
(SCR), 38; 318/227, 231, 332, 432, 434, 512, 513;
321/2, 43, 45

[56] References Cited
UNITED STATES PATENTS

| 3,181,051 | 4/1965 | Marshall | 318/513X |
| 3,325,715 | 6/1967 | Jacoby | 323/22X |
| 3,414,795 | 12/1968 | Weiser | 318/434X |
| 3,457,487 | 7/1969 | Cooper | 318/332 |
| 3,496,444 | 2/1970 | King et al. | 321/2 |

*Primary Examiner*—William M. Shoop, Jr.
*Assistant Examiner*—A. D. Pellinen
*Attorneys*—Robert E. Burns and Emmanuel J. Lobato ABSTRACT: A reactor includes windings connected between thyristor-type choppers and a load. The windings are magnetically coupled with one another so as to maintain flows of current therethrough substantially equal in magnitude to one another.

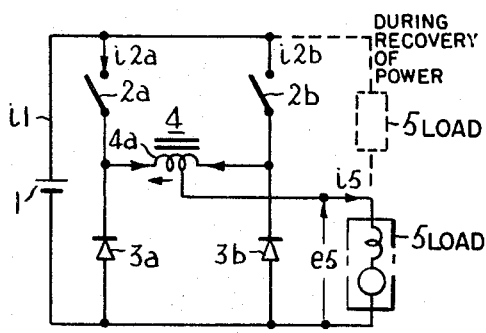
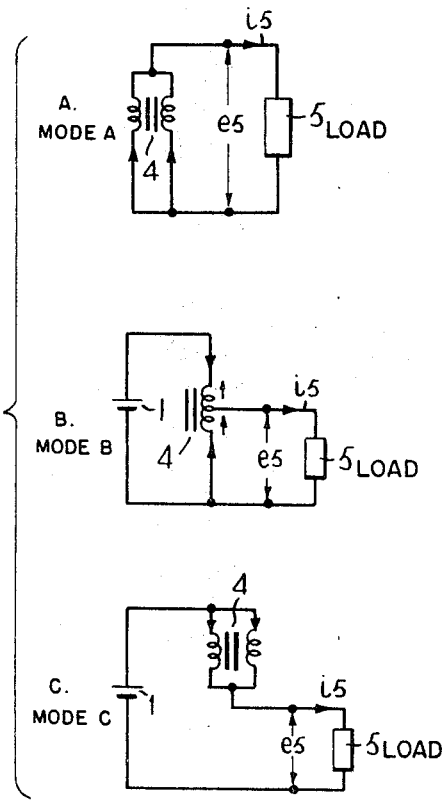
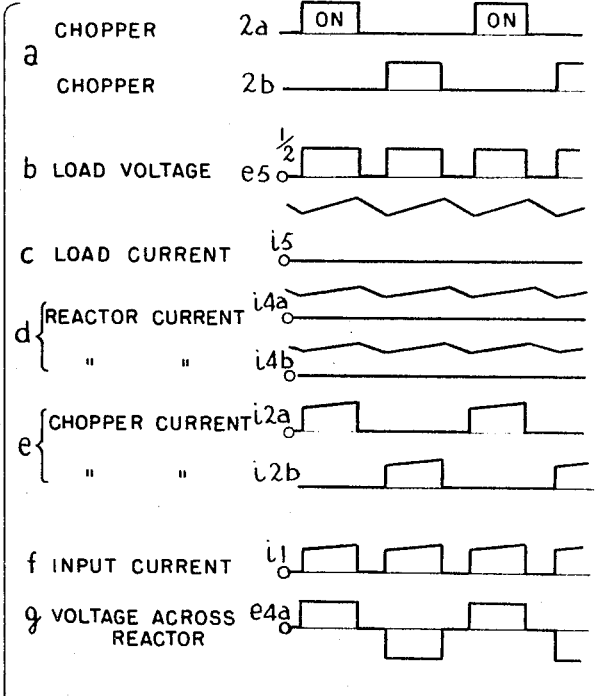
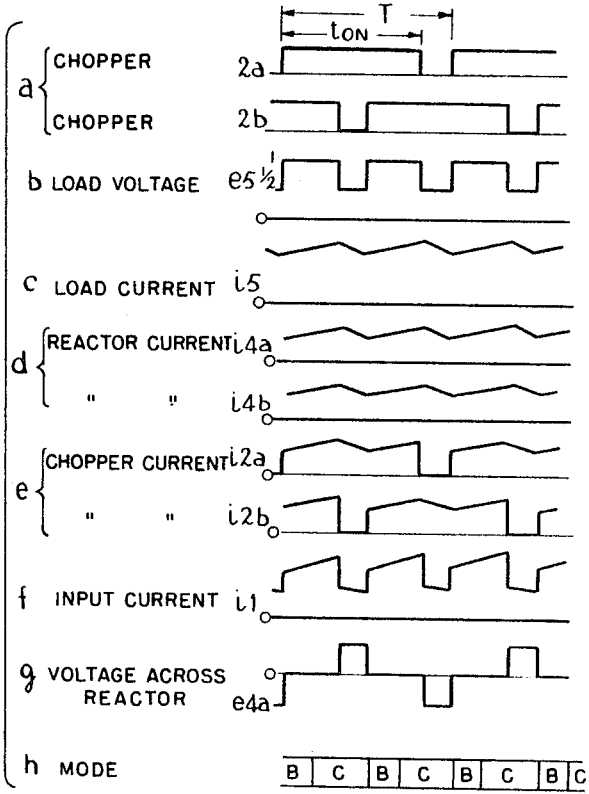

MULTIPHASE DC CHOPPER CIRCUIT

BACKGROUND OF THE INVENTION

This invention relates to improvements in a system for controlling an electrical power of direct current in switching mode through the use of contactless switches such as thyristor-type choppers or switching transistors.

The DC power control systems of switching type referred to have been widely used as controls for electric motors and power sources but they are high in alternating current component of output voltage or current as well as their input currents are high in alternating current component. In other words, filters were required to be disposed on the input and output sides. This caused such systems to greatly increase in dimension and weight. Especially the alternating current component of the input might cause inductive interference or disturbances which are an important problem encountered in controlling electrically operated vehicles.

SUMMARY OF THE INVENTION

Accordingly it is an object of the invention to provide a new and improved DC power control system of switching type capable of decreasing alternating current components of its output voltage or current and input current and therefore the required capabilities of input and output filters.

It is another object of the invention to provide a new and improved DC power control system further less in weight than the conventional type of polyphase multiple chopper systems capable of considerably achieving the object as described in the preceding paragraph as well as decreasing an alternating current component of an output current from each chopper branch included in the system thereby to alleviate the commutation duty imposed on each chopper involved and correspondingly decrease a loss of commutation to decrease a dimension and a weight of each commutation circuit involved.

According to the invention there is provided a system for controlling an electrical power of direct current, comprising a plurality of switching means energized by a common source of direct current and controlled to be turned ON and OFF in such a manner that each of said switching means is turned ON and OFF at time points behind time points where the directly preceding switching means is turned ON and OFF by predetermined intervals of time respectively, one reactor winding section serially connected to each of said plurality of switching means, a load or loads through which the sum of currents from said reactor winding sections or currents from said winding sections flows or flow respectively, characterized by magnetically coupling means for rendering said reactor currents always substantially equal to one another.

The magnetically coupling means may, preferably include a plurality of magnetic paths for rendering said reactor currents always substantially equal to one another and another magnetic path magnetically coupled to said plurality of magnetic paths through air gaps.

BRIEF DESCRIPTION OF THE DRAWINGS

The invention will become more readily apparent from the following detailed description taken in conjunction with the accompanying drawings in which:

FIG. 1 is a schematic circuit diagram of a control system according to the principles of the invention;

FIGS. 2A, 2B and 2C are circuit diagrams useful in explaining the operation of the system illustrated in FIG. 1;

FIGS. 3A and 3B are waveforms developed at various points of the circuit illustrated in FIG. 1;

Throughout several FIGS. the same reference characters designate the corresponding or similar components.

DESCRIPTION OF THE PREFERRED EMBODIMENTS

Figure 4:
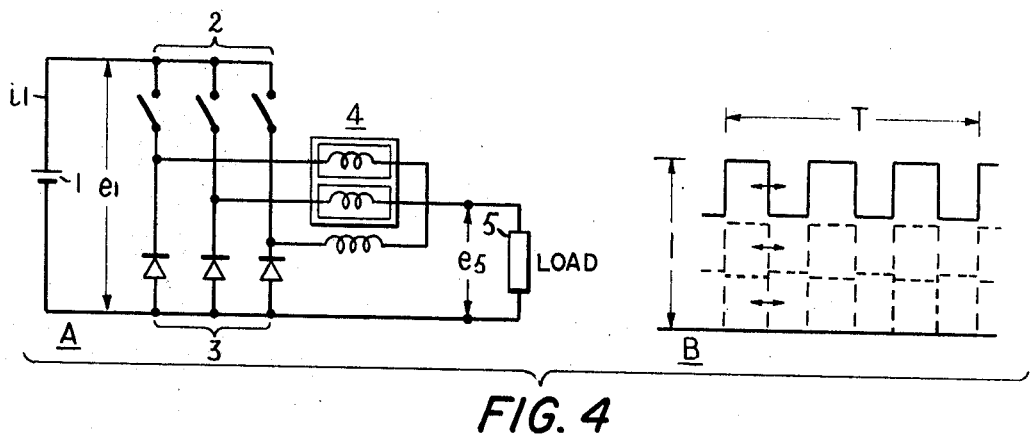
FIG. 4A is a schematic circuit diagram of a modification of the invention.
FIG. 4B is waveforms useful in explaining the operation of the circuit illustrated in FIG. 4A.

Referring now to the drawings and FIG. 1 in particular, it is seen that a source of direct current 1 has connected thereacross two chopper units or branches each comprising a switching device 2a or 2b (which may be called hereinafter a chopper) and a fly wheel diode 3a or 3b serially connected to each other with both diodes connected in reversed series circuit relationship to each other through a reactor 4. The reactor 4 includes a reactor winding 4a inductively disposed around a magnetic core of multiple leg-type and a central tap or common output terminal reactor on the winding 4a connected to one side of a load 5 connected on the other side to both the anode electrodes of the diodes 3a and 3b and one side of the source 1. A control (not shown) is provided for controlling turning ON and OFF of both choppers 2a and 2b in such a manner that a predetermined interval of time or a predetermined phase difference is provided between turning ON or OFF of the chopper 2a and that of the chopper 2b respectively. In other words, each of the switches 2a, 2b is operable in an ON-OFF mode and control means (not shown) sequentially actuates the switches in a well known manner whereby a plurality of current pulses is repeatedly produced.

As shown at dotted line in FIG. 1, the load 5 may be connected between the central tap or common output terminal on the reactor winding 4a and the other side of the source 1 during the recovery of power.

If both the choppers 2a and 2b are in their OFF state then the circuit illustrated in FIG. 1 may be equivalent to a circuit shown in FIG. 2A wherein a current $i_s$ flowing into the load 5 is divided into two current portions of equal magnitude flowing in the opposite directions through both halves of the winding 4a respectively. The winding are wound around the magnetic core so as to cancel out both magnetomotive forces resulting from these current portions flowing through both halves of the winding. Therefore no voltage is induced across the winding 4a to render voltages $e_s$ across the reactor load 5 equal to zero. The operation of the circuit just described may be called hereinafter the mode A of operation.

With one of the choppers in its ON state and the other chopper in its OFF state, the circuit shown in FIG. 1 may be equivalent to a circuit illustrated in FIG. 2B. Under these circumstances, the source 1 tends to apply the voltage thereacross to the load 5 through the chopper now put in its ON state but the current portions flowing through the two winding sections are constrained to be always equal to each other by means of the transformation action of the reactor. In other words, a voltage is induced across the reactor which permits a current equal to that tending to flow from the source 1 through the conducting chopper into the load 5 to flow from the side of the fly wheel diode into the load. This causes the voltage $e_s$ across the load 5 to be equal to a half the source voltage. Namely the reactor serves as an autotransformer. The operation of the circuit just described may be called hereinafter the mode B of operation.

When both the choppers are in their ON state, the circuit illustrated in FIG. 1 may be equivalent to a circuit shown in FIG. 2C wherein each of the choppers serves to supply a half the load current from the source to the load therethrough. Under these circumstances, the reactor effectively short circuits to induce no voltage thereacross with the result that the voltage $e_s$ across the load is equal to the full source voltage. The operation of the circuit just described may be called hereinafter the mode C of operation.

It is now assumed that one of the choppers in this example the chopper 2b is turned ON or OFF at a time point behind that at which the other chopper 2a has been turned ON or OFF by an interval of time equal to a half the system period T and that the conduction time $t_{ON}$ of each chopper is equal to or less than a half the system period T as shown at waveforms a in FIG. 3A. Thus the circuit illustrated in FIG. 1 is successively put in the modes A, B, A and B of operation as shown in FIG. 3A h in the named order in one operating cycle. Then the voltages $e_s$ across the load 5 varies between zero and a half the source voltage and continues for the conduction time of each chopper as shown at waveform *b* in FIG. 3A. A load current $i_s$ flows through the load as shown at waveforms *c* in FIG. 3A and is composed of two flows of current $i_{4a}$, $i_{4b}$ equal and opposite through the two halves of the reactor winding $4a$ as shown at waveforms *d* in FIG. 3A. the currents $i_{4a}$ and $i_{4b}$ each being equal to a half the load current $i_s$ and varying in the similar manner as does the latter current. This is because the reactor is operated always to provide the currents equal.

Under these circumstances, the choppers $2a$ and $2b$ will have flowing therethrough the respective current pulses represented by currents $i_{2a}$ and $i_{2b}$ as shown at waveforms *e* in FIG. 3A and a current $i_1$ as shown at waveform *f* in FIG. 3A is drawn from the source 1. Also as the reactor 4 has applied thereacross a voltage only in the mode B of operation and the choppers are alternately turned ON the reactor has induced thereacross a voltage $e_{4a}$ of alternate polarity as shown at waveform *g* in FIG. 3A and is not saturated for the reason that the magnetomotive forces caused from the currents $i_{4a}$ and $i_{4b}$ cancelled out each other.

It is now assumed that the conduction time $t_{ON}$ of each chopper is greater than a half the system period T as shown at waveforms *a* in FIG. 3B. Under these circumstances, the mode C of operation alternates with the mode B of operation as shown in FIG. 3B *h*. Therefore the voltage applied across the load varies between a half the source voltage in the mode B of operation and the full source voltage in the mode C of operation as shown at waveform *b* in FIG. 3B. Waveforms *c* through *g* illustrated in FIG. 3B correspond to those designated by the same reference character in FIG. 3A. In FIG. 3B at least one of the choppers is always in its ON state and therefore a current $i_1$ composed of input current pulses represented by currents $i_{2a}$, $i_{2b}$ shown at waveforms *e* and drawn from the source contains the fundamental component approximately equal to a half its maximum magnitude as shown at waveform *f*. Also since the source applies its voltage to the reactor only in the mode B of operation the reactor has induced thereacross a voltage $e_{4a}$ as shown at waveform *g* in FIG. 3B.

From the foregoing it will be apparent that in the two phase chopper system such as illustrated in FIG. 1, a fluctuation of the input current reaches approximately a half the output current while a fluctuation of the output voltage reaches approximately a half the source voltage with the fluctuation having a period corresponding to one operating cycle.

FIG. 4 shows a three phase chopper system including three choppers according to the principles of the invention. The arrangement illustrated is substantially similar to that shown in FIG. 1 excepting for three reactor winding sections inductively disposed around three legs of a magnetic core respectively and connected between the respective choppers and a load.

While the invention has been illustrated in terms of the two and three phase systems it is to be understood that the same is equally applicable to an *m* phase system using *m* choppers. In this case, a reactor has *m* winding sections inductively disposed on *m* legs of its magnetic core respectively and connected between the associated choppers and a common load.

With an *m* leg-type core used, legs having inductively disposed thereon the respective winding sections form a set of parallel magnetic circuits and therefore magnetomotive forces induced therein are always equal to one another. If the windings inductively disposed on the core legs respectively are equal in number of turns to one another then the windings have flowing therethrough currents equal to one another. In other words, any tendency to cause any difference or unbalance among the currents flowing through the respective winding sections produces unbalanced magnetomotive forces in the material of the core to vary the magnetic fluxed induced in the material which, in turn, generates magnetomotive forces serving to eliminate the unbalance among the currents.

When the *m* winding sections are connected between output terminals of the associated choppers and the common load as above described the output currents $i_{o1}......i_{om}$ delivered from the respective choppers are equal to one another or (1) $\quad i_{o1}=i_{o2}=\ \ \ =i_{om}$ On the other hand, as the winding sections are connected to the common load, a load current $i_o$ is expressed by the equation (2) $$i_o = \sum_{k=1}^{m} i_{ok}$$

where K represents any integer between zero and *m* and $i_{ok}$ represents the output current flowing through the $K^{th}$ reactor winding. Therefore (3) $$i_{o1}=i_{o2}=\cdots=i_{om}=\frac{i_o}{m}$$

Assuming that *n* choppers among the *m* phases are put in their ON state an input current $i_1$ drawn from the source is expressed by (4) $$i_i = \frac{n}{m} i_o$$

On the other hand, since the balanced relationship should be held between the input and output powers the reactor does not accumulate an electrical energy therein. This results in (5) $\quad e_i i_i = e_o i_o$ where $e_i$ and $e_o$ are an input and an output voltage respectively. From the equations (4) and (5) the following equation (6) yields (6) $$e_o = \frac{n}{m} e_i$$

This means that in the *m* phase system, an input current and an output voltage at any given time point may be respectively expressed by the equations (4) and (6) dependent upon the number of the choppers put in their ON state at that time point.

It is now assumed that the *m* phase choppers are put in synchronous operation in which each chopper is turned ON or OFF at a time point behind a time point where the directly preceding chopper has been turned ON or OFF by an interval of time equal to $1/m$ of the system period T. Then the number of the choppers simultaneously put in overlapped conduction state increases by one each time the conduction time $t_{ON}$ of the chopper exceeds $T/m$ and varies only by one in terms of the time and for a given relative conduction time or a ratio of the conduction time $t_{ON}$ to the system period T.

Therefore each of the output voltage and input current varies to form a rectangular waveform changing between any two adjacent levels selected from *m* levels dividing the source voltage or the output current in *m* equal portions. For example, in the case of a three phase system as shown in FIG. 4A, it varies as shown at dot-and-dash line for $tON/T<1/3$, at dot line for $1/3<tON/T<2/3$ and at solid line for $<2/3<tON/T$ in FIG. 4B.

Accordingly it will be appreciated that, with *m* choppers used, the input voltage or the output voltage has an alternating current component decreased by a factor of *m* with the alternating current component having a frequency equal to the operating frequency of the choppers multiplied by a factor of *m*.

From the above description it will be apparent that a decrease in alternating current component of each of the input current and output voltage of each chopper itself cooperates with an increase in frequency of alternating current component to reduce the dimension and weight of the reactors required on the input and output sides. Further, in the case the load such as an electric motor itself has a filtering function, a ripple of the output current can decrease to sufficiently small magnitude without the necessity of providing any output filter. For example, the invention applied to a three phase chopper system operating with a frequency of 100 cycle per second could decrease a current ripple to 5 percent or less without the using of any output filter.

Figure 5:
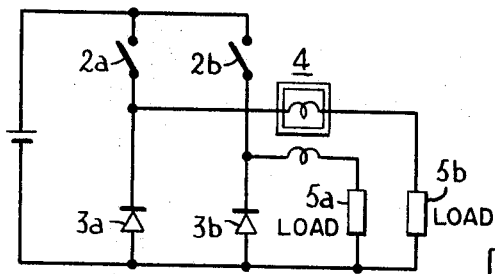
FIGS. 5 through 8 are schematic circuit diagrams of other embodiments of the invention.

Also the reactor for use in the invention is extremely small in dimension and weight ad compared with smoothing reactors necessarily used in the conventional chopper systems. For example, a reactor used in the above-mentioned example decreased by a factor of 10. This is because the ripple voltage reduced to a third and the ripple frequency increased by a factor of three while the core of the reactor could be effectively utilized to such an extent that it was driven to saturation in the opposite directions. On the contrary, the conventional-type of smoothing reactors had a high DC bias applied thereto and a variation in magnetization was caused only from the ripple current resulting in a very poor utility. Further, according to the invention an inductance of a load such as an electric motor itself is sufficient to perform the filtering operation without the need for providing any smoothing filter. FIG. 5 shows a two phase chopper system wherein two choppers $2a$ and $2b$ are connected to two loads $5a$ and $5b$ having the substantially same characteristics through separate winding sections inductively disposed on two core legs of a reactor 4. In this example the reactor 4 acts as a transformer whereby the circuit illustrated holds the equation (3). In addition, since both loads $5a$ and $5b$ are substantially equal in characteristics to each other currents flowing through both loads are necessarily equal to each other. This means that the circuit illustrated in FIG. 5 gives the same result as the arrangement of FIG. 1 including a single load. It is to be understood that the concept of the invention illustrated in FIG. 5 may be extended to an $m$ phase system utilizing a reactor core having $m$ legs.

Figure 6:
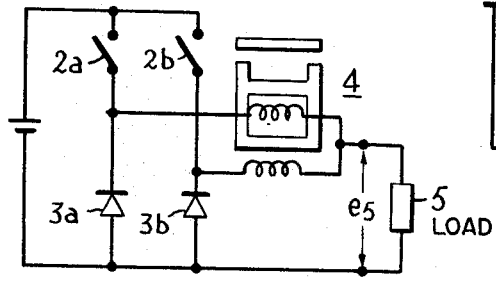

An arrangement shown in FIG. 6 is similar to that illustrated in FIG. 5 except for an additional core leg operatively coupled to two leg reactor cores through air gaps and having no winding section inductively disposed thereon. As in the previous embodiments, currents flowing through all the winding sections respectively are maintained in balanced relationship. In addition, currents flowing through the winding sections not only generate magnetomotive forces equal in the associated legs but also flow magnetic fluxes through the additional core leg. These magnetic fluxes then serve to equally suppress variations in currents flowing through the respective winding sections. In other words, the additional core leg resembles a smoothing reactor in operation and therefore the reactor 4 illustrated in FIG. 6 are equivalent to a transformer and smoothing reactors, one for each phase, united into a unitary structure. This leads to a remarkable result that the device becomes small in dimension and weight even though it would be low in the number of phases to give the less effective results.

In the case an $m$ leg-type core is used, it will be seen from the equations (1) and 3) that if either of these equations is held that the other equation is also held. This results in the generic aspect of the invention that there is provided any suitably magnetically constraining or coupling means for rendering the output currents delivered from the choppers always substantially equal to one another. This generic aspect of the invention may be also realized by an arrangement shown in FIG. 7 or 8.

Figure 7:
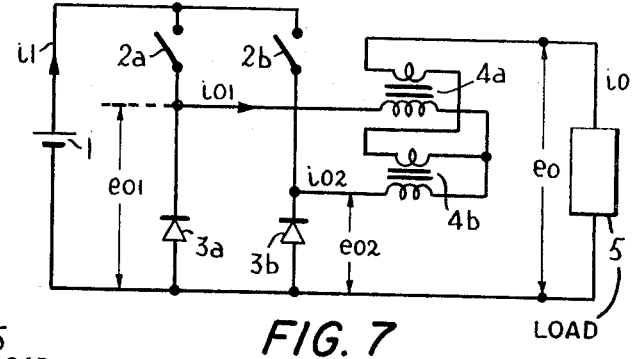
Figure 8:
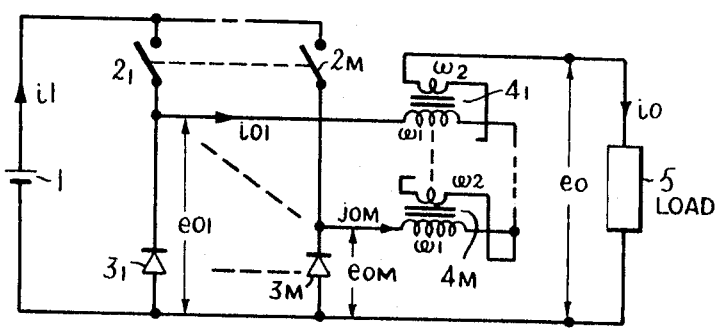

The arrangement shown in FIG. 7 or 8 is similar to that illustrated in FIG. 1 except for the construction of the reactor or transformer. As shown in FIG. 7, the reactor device 4 acting as a transformer device includes two independent transformers $4a$ and $4b$ each having a primary winding connected at one end to the associated chopper $2a$ or $2b$ with all the windings connected together at the other ends. The transformer device 4 includes secondary windings equal in number to the primary phases and connected in series circuit to a common load 5. Therefore it will be appreciated that each transformer hold the equation (3).

FIG. 8 is a view similar to FIG. 7 but illustrating an $m$ phase system including $m$ choppers $2_1......2_m$, fly wheel diodes $3_1......3_m$ and $m$ transformers $4_1......4_m$. As in FIG. 7, $m$ primary windings $w_1$ on the transformers $4_1......4_m$ are connected to the associated choppers while $m$ secondary windings $w_2$ are connected in series to a common load 5.

I claim:
1. A multiphase DC chopper system comprising: a source of direct current; a plurality of switching means connected to said source of direct current controlled to be turned ON and OFF in such a manner that each of said switching means is turned ON and OFF at time points behind time points when the directly preceding switching means is turned ON and OFF by predetermined intervals of time respectively; one reactor winding section serially connected to each of said plurality of switching means; load means connected in common to said reactor winding sections for passing therethrough the sum of currents flowing through said reactor winding sections; and magnetic coupling means magnetically coupled to said reactor windings for rendering said reactor currents always substantially equal to one another.

2. A multiphase DC chopper system according to claim 1; wherein said magnetic coupling means comprises a magnetic core including a plurality of leg portions each having one of said reactor winding sections inductively disposed thereon and interconnecting portions interconnecting said leg portions.

3. A multiphase DC chopper system according to claim 1; wherein said magnetic coupling means comprises a magnetic core including a plurality of leg portions each having one of said reactor winding sections inductively disposed thereon, interconnecting portions interconnecting said leg portions, and another leg portion spaced apart from and magnetically coupled to said interconnecting portions.

4. A multiphase DC chopper circuit comprising: a direct current source; switching means connected to said direct current source including a plurality of sequentially actuated switches each operable in an ON-OFF mode cooperative together to repeatedly develop a plurality of current pulses out of phase with respect to each other whereby one current pulse of each said plurality of current pulses flows through each said switch; a reactor winding connected in series with each said switch receptive of the respective current pulses flowing therethrough and having a common output terminal; load means connected to both said common output terminal and said direct current source receptive of the current pulses flowing through each said reactor winding for developing a corresponding output signal; and magnetic coupling means magnetically coupled to each said reactor winding for maintaining the magnitude of current pulses flowing through each said reactor winding equal.

5. A multiphase DC chopper circuit according to claim 4; wherein said magnetic coupling means comprises a magnetic core member having a plurality of leg portions, and wherein each said reactor winding is inductively coupled to one of said leg portions.

6. A multiphase DC chopper circuit according to claim 5, including another magnetic core member spaced apart from and magnetically coupled to said first-mentioned magnetic core member effective to suppress current variations in said reactor windings.